April 28, 1970  J. LAIBSON ET AL  3,508,677
VESSEL FOR STORING HIGH PRESSSURE GASES
Filed Aug. 20, 1968  3 Sheets-Sheet 1

INVENTORS
JERRY LAIBSON
EMERSON R. HARMON
RICHARD R. HEITKAMP
BY Fraser and Bogucki
ATTORNEYS

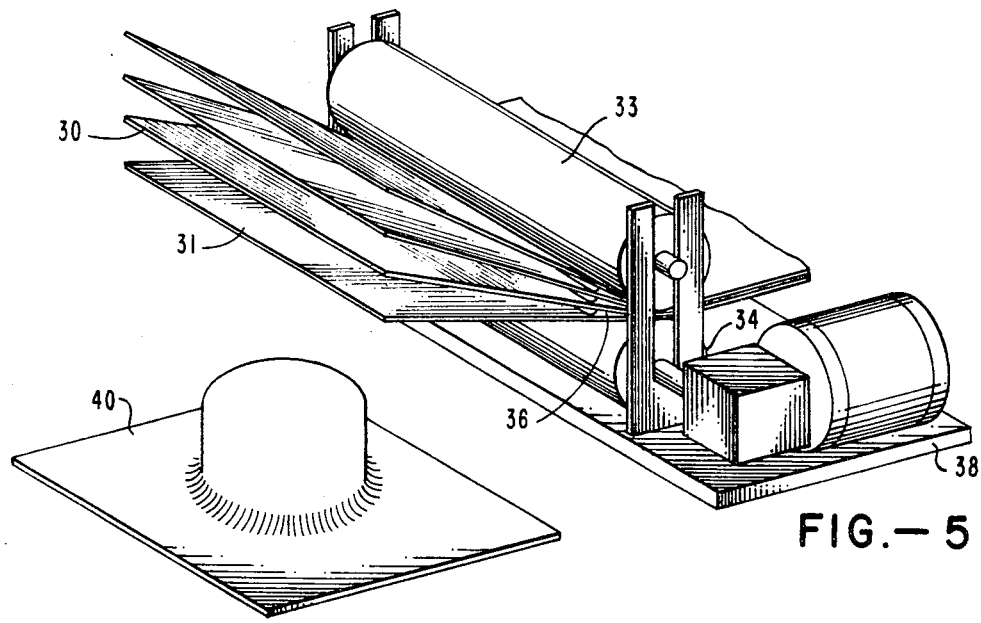
FIG.—5
FIG.—6
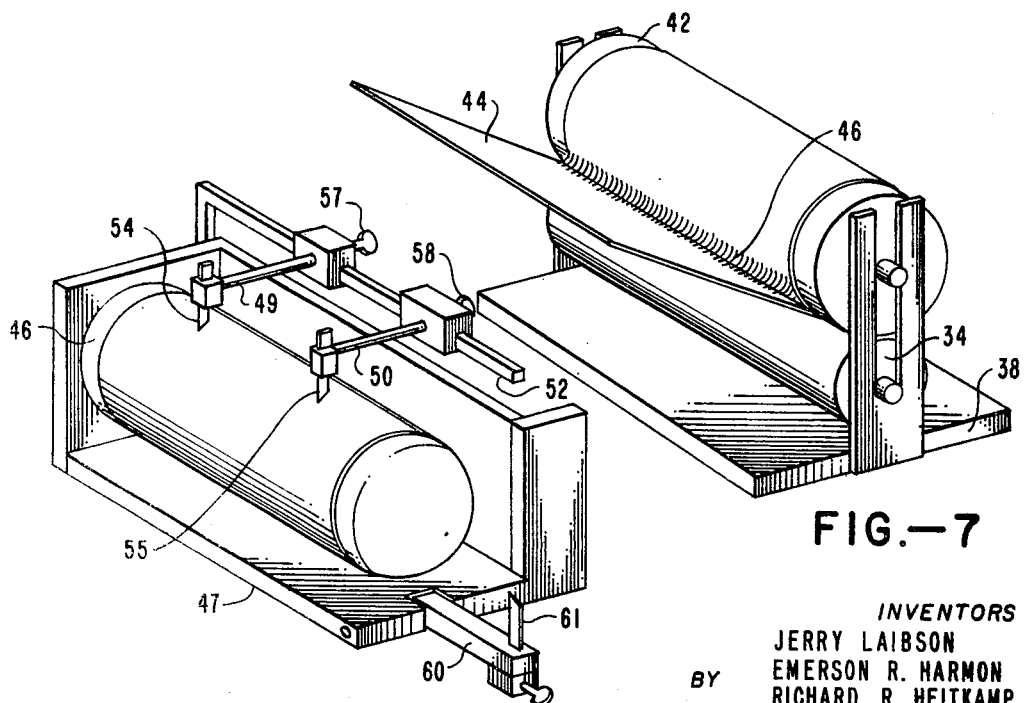
FIG.—7
FIG.—8
INVENTORS
JERRY LAIBSON
EMERSON R. HARMON
RICHARD R. HEITKAMP
BY
Fraser and Boguchi
ATTORNEYS April 28, 1970   J. LAIBSON ET AL   3,508,677
VESSEL FOR STORING HIGH PRESSSURE GASES
Filed Aug. 20, 1968   3 Sheets-Sheet 3
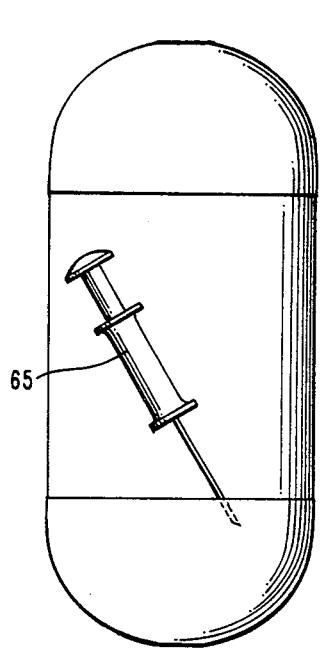
FIG.—9
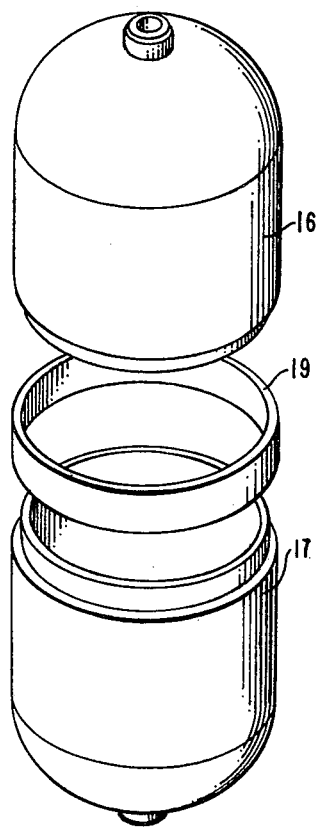
FIG.—10
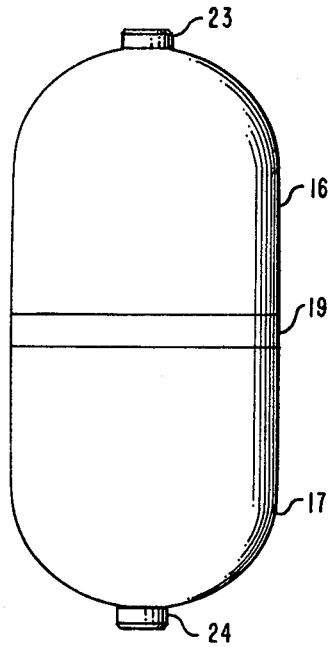
FIG.—11
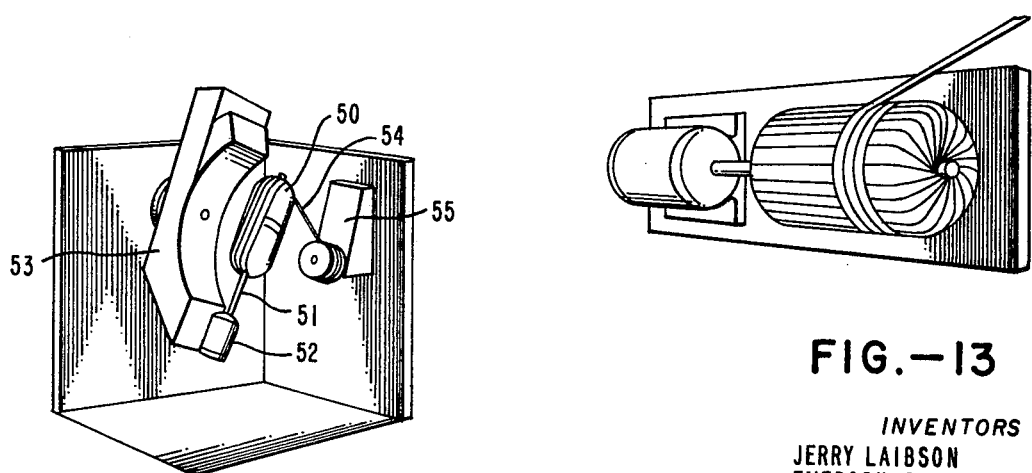
FIG.—12
FIG.—13
INVENTORS
JERRY LAIBSON
EMERSON R. HARMON
RICHARD R. HEITKAMP
*Fraser and Bogucki*
ATTORNEYS United States Patent Office 3,508,677
Patented Apr. 28, 1970

3,508,677
VESSEL FOR STORING HIGH-PRESSURE GASES
Jerry Laibson, San Diego, Emerson R. Harmon, El Cajon, and Richard R. Heitkamp, Long Beach, Calif., assignors to Whittaker Corporation, Los Angeles, Calif., a corporation of California
Filed Aug. 20, 1968, Ser. No. 753,908
Int. Cl. B65d 25/00, 7/42
U.S. Cl. 220—3
12 Claims

ABSTRACT OF THE DISCLOSURE

A vessel for storing gases under extreme pressures for relatively long periods comprises:

(a) A thermoplastic resin inner liner;
(b) An intermediate diaphragm bonded to and completely enclosing the inner liner; and
(c) An exterior housing composed of multiple layers of resin impregnated fiber glass strands wound in substantially perpendicular directions and having a slip plane between selected layers.

FIELD OF THE INVENTION

The present invention relates to filament wound pressure vessels capable of storing compressed gases under extremely high pressures without substantial leakage for long periods of time, and to the method of constructing such vessels.

BACKGROUND OF THE INVENTION

Recently certain emergency escape and landing techniques using amounts of pressurized gas have been developed for high speed aircraft and spacecraft. In one such arrangement for military aircraft, the entire manned section of the aircraft fuselage is separated from the remaining air frame in an emergency to act as an escape capsule. After separation, parachutes are deployed from the capsule to slow its rate of descent, and prior to impact large flexible bags are inflated to cushion the landing shock or to provide flotation in the event of a water landing. The gas required to inflate the bags is stored until needed at extremely high pressures in small vessels to conserve valuable space in the aircraft. Gases at pressures as high as several thousand pounds per square inch must be stored without substantial leakage for intervals of a year or more. The pressure vessels are desirably installed during manufacture of the aircraft so as not to require replacement or recharging during normal periods of operation. Equipment needed for such testing and recharging of the high pressure containers is generally not available at normal operation points but only at the factories and major overhaul facilities.

Presently, high pressure storage vessels are prepared from high strength steel or similar materials. Although such vessels meet necessary strength requirements, they are considered extremely dangerous for aircraft use. Any puncture or crack in the metal bottle would most likely result in an explosion in which the high internal gas pressures drive the metal fragments of the shattered bottle outward with great force in all directions. In military use, a single bullet or shell fragment that might otherwise cause little or no damage, could upon striking the vessel, destroy or severely damage the entire aircraft and kill or severly injure its crew. To minimize the danger, the thickness of the metal walls can be increased to resist punctures and cracking, or the vessel surrounded with armor to prevent its being struck. However, in most cases the added weight involved is not compatible with critical weight limitations inherent in the design of such modern aircraft.

Recently, investigations have been directed towards the development of a non-metallic container for high pressure gas storage. However, to the present such efforts have for the most part been unsuccessful since available materials have either not had sufficient strength to withstand the extremely high internal gas pressures or possess excessive gas permeability at high pressures over long time periods.

SUMMARY OF THE INVENTION

The multishell high pressure vessels in accordance with this invention consist of a preformed thermoplastic resin inner liner, an intermediate diaphragm and a filament wound exterior housing of bonded fiber glass material. Access fittings at the ends of the bottles extend beyond the fiber glass housing and into the vessel interior.

In a preferred embodiment, the liner is formed of nylon or similar high strength and gas impermeable thermoplastic resin film consisting of two hemispherical end cap sections bonded to a central cylindrical section. The hemispherical end caps are vacuum formed from a thermoplastic resin film which may consist of a laminate film layer in which the grain of each successive layer is oriented with its grain perpendicular to the grain of adjacent layers. The central cylindrical section may consist of a continuous roll of heat cured resin film laminate bonded in successive layers with the grain oriented circumferentially. During fabrication, the individual resin liner sections are heat cured to prevent shrinkage and minimize moisture content, and are stored in sealed containers between operations to keep out moisture.

The preformed liner sections are cut to size and assembled on a hollow water soluble mandrel to be bonded together to form a continuous impermeable liner surface. Port fittings are molded into ends of the diaphragm halves. The mandrel with the liner, diaphragm and fittings in place is wound with a continuous stranded fiber glass tape in a longitudinal pattern with successive turns from end to end progressing circumferentially around the cylinder. A binder impregnated into the tape or applied during the winding process bonds the fiber glass together to form a cohesive, unitary structure. The longitudinal winding pattern is continued to build up multiple overlying layers to a predetermined thickness. This is followed by a circumferential winding pattern in which the fiber glass tape is wound in a reciprocating spiral about the central cylindrical portion to add additional layers of a predetermined thickness to the bottle structure at that point. Additional layers are added alternating the longitudinal and circumferential patterns to build up the required overall thickness desired to withstand the high internal gas pressure. At predetermined points during the winding, the binder is allowed to set and a coating of resin, which, when cured has essentially frictionless properties, is applied to the existing outer surface to prevent bonding to the next layer added. The unbonded adjacent layers of fiber glass form a slip plane that permits relative movement between adjacent layers during expansion or contraction of the completed bottle. This, in effect, results in a series of concentric fiber glass bottle structures closely packed one inside the other but moveable circumferentially with respect to one another under stress.

BRIEF DESCRIPTION OF THE DRAWINGS

FIG. 5 illustrates the preferred manner of bonding the individual resin sheets to form the multi-ply laminate used in preparing the end cap sections of the inner liner;

FIG. 6 shows the thermoplastic resin film laminate molded in the shape of hemispherical end cap sections of the inner liner;

FIG. 7 illustrates a preferred method of forming the central cylindrical section of the inner liner;

FIG. 8 illustrates a device used in cutting the end cap and central cylinder sections of the inner liner to the desired size;

FIG. 9 is a plan view showing the inner liner sections assembled on the mandrel of FIG. 2 and being bonded to one another to form a continuous inner liner;

FIG. 10 shows a view of the individual sections of the diaphragm into the ends of which the port fittings are molded;

FIG. 11 is a plan view showing the diaphragm assembled on a mandrel and enclosing the resin inner liner with the port fittings inserted at the opposite ends;

FIG. 12 is a schematic drawing showing the winding of a multi-strand fiber glass tape in a longitudinal pattern to form the outer housing structure; and FIG. 13 shows the winding of the multi-strand fiber glass tape in a circumferential pattern in forming the outer housing structure.

DETAILED DESCRIPTION

Figure 1:
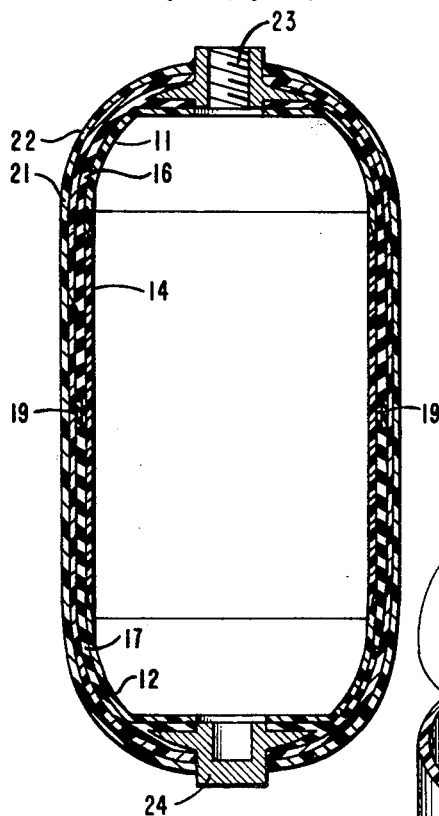
FIG. 1 illustrates a preferred embodiment of a multishell, filament wound gas pressure vessel constructed in accordance with the invention, with a portion broken away to show a partial section of the successive material layers.

Referring to FIG. 1, the filament-wound pressure vessel has an inner liner consisting of laminated film of synthetic resin. The resin may be any thermoplastic polymeric resin material which can be easily shaped and which is essentially impermeable to gas molecules.

Preferred resins include polyamide resins generally referred to as nylon in its various forms and the vinyl and vinylidene halide resins. Such resins are readily available in sheet form, for example, as nylon 6, Tedlar, Kynar, the latter being the respective registered trademark of E. I. du Pont de Nemours and Co. for polyvinyl fluoride resins and Pennsalt Chemical Corp. for polyvinylidene fluoride resins. The specific resin utilized will depend on the strength and gas permeability requirements desired which in turn will depend on what pressures the vessel will encounter. Teflon TFE (polytetrafluoroethylene) and Teflon FEP (tetrafluoroethylene-hexafluoropropylene copolymers) may also be used. Prior to lamination and formation of the inner liner, it is necessary to heat stabilize the resin films or sheets as will be described hereinafter.

The inner liner may be made up of two hemispherical end cap sections 11 and 12 that overlap with and are bonded to a central cylindrical section 14 so as to provide an essentially smooth, regular exterior and interior surface. An intermediate diaphragm enclosing the inner liner is composed of two half-sections 16 and 17 sealed together at their abutting surfaces around the center circumference with an overlying elastomeric strip 19. Strip 19 extends around the circumference fitting into the annular recess formed by adjacent shoulders on sections 16 and 17, and is bonded to the outer surfaces of the recessed shoulders on either side of the separation. The diaphragm material preferably consists of an elastomer or rubbery polymer such as cloral butyl rubber, SBR, neoprene, silicone rubber and the like which are capable of being cured during formation as will be more clearly described herein.

An outer or exterior housing structure consisting of separate shells 21 and 22 of wound fiber glass tape, cord, roving or other suitable filament encloses the diaphragm to provide the necessary structural strength for withstanding the high interior vessel pressures. As will be described more fully in detail, the layers 21 and 22 preferably consist of a continuously wound fiber glass tape alternately wound in a longitudinal pattern from end to end and a circumferential pattern around the central cylindrical portion of the bottle. Binding resin which has been preimpregnated into the tape or coated thereon during winding, joins successive strands together and cures to form a unitary fiber glass shell structure of a desired thickness. After inner shell 21 is wound to the desired thickness, the outer surface is then treated with a frictionless resin to prevent its binding to the next wound fiber glass layer which would form the inner surface of the outer shell 22. The adjacent unbound layers formed in this manner provide a slip plane between the inner and outer shells 21 and 22 which permits free rotational movement of these shells with respect to one another thus preventing undue strain on the innermost and outermost fiber glass filaments during expansion or contraction of the shell structure.

A port fitting 24 defines an access opening extending through the end portions of the fiber glass shells 21 and 22, the respective diaphragm half section 16 or 17 and the respective resin liner end caps 11 or 12. These port fittings 24 are molded with the diaphragm sections 16 and 17 during formation and are sealed and held in place by the wound fiber glass. Where desired, only one port fitting may be used to provide access to charge the vessel or one of the port fittings may be blind. Suitable materials include metals or plastics.

Other structural details of these multishell pressure vessel containers are best appreciated in considering the mode of construction of the various component elements and their assembly into the finished product.

Figure 2:
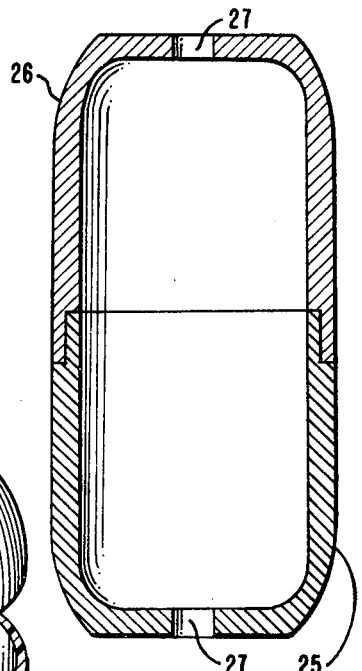
FIG. 2 is a full cross-sectional view of a water soluble mandrel upon which the pressure vessel of FIG. 1 may be assembled.

Referring now to FIG. 2, a water soluble mandrel consists of male and female half secitons 25 and 26, respectively, formed with opposed mating flanges and each having a shaped opening at their ends for receiving winding shafts. The mandrel half sections 25 and 26 are individually cast either by conventional slurry casting techniques or by static casting using a hot melt, water soluble composition, such as that currently sold by Rezolin, Inc. under its registered trademark "Paraplast." The outer dimensions of the assembled mandrel sections 25 and 26 correspond to the desired inner dimensions of the pressure vessel, and the outer surfaces should be smooth for receiving the inner liner.

Figure 3:
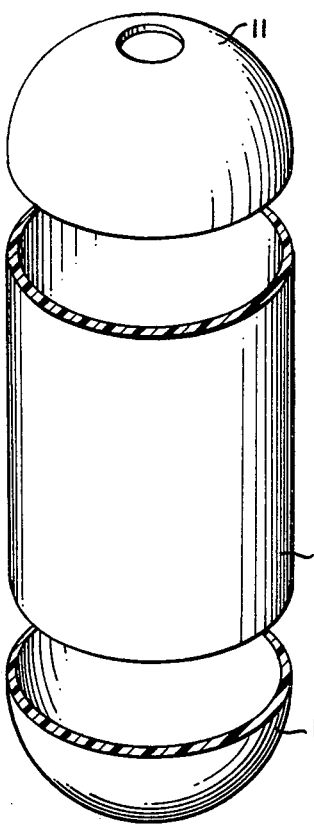
FIG. 3 is a plan view showing the preformed laminated resin sheet sections that are joined to form an impermeable inner liner.

Referring to FIG. 3, the central cylindrical inner liner section 14 and the upper and the lower hemisperical shaped sections 11 and 12 are fabricated separately to be bonded together on the mandrel in the manner hereinafter described to form a unitary liner substantially impermeable to high internal pressures. The inner liner thickness is suitably between about 15 and about 60 mils. Accordingly, where resin sheets having an individual thickness of about 5 mils are used in preparing the laminated structure, about 3 to 12 layers may be used. Alternatively, one or more layers of a thicker sheet may be chosen. Thus, a single sheet having a thickness of about 15 mils may be used or a number of such sheets may be laminated. The specific liner thickness will depend on the pressure at which the vessel will be used as well as the gas permeability factors of the resins. It should be noted that the inner liner must be somewhat flexible so that it is capable of expanding and contracting when under gas pressure and pressure release during use. Where the thickness of the laminate is too great, that is where too many layers of resin sheets have been used, the structure has a tendency to be brittle and thus cannot be easily formed or flexed when pressurized. This is especially critical in molding the end cap sections 11 and 12 in a die as described in more detail below. On the other hand, although a single 15 mil sheet requires substantially less effort and expense in preparing low pressure liners, a laminate of thinner sheets are preferred for higher pressures. In the preferred embodiment, each section is formed from a multiple ply laminate of nylon film having a thickness of about 5 mils. Such film is currently sold by Allied Chemical under its trademark "Capran 80" in continuous rolls of varying widths and lengths. A nylon liner of this material is found to be outstanding because of its low gas permeability.

Figure 4:
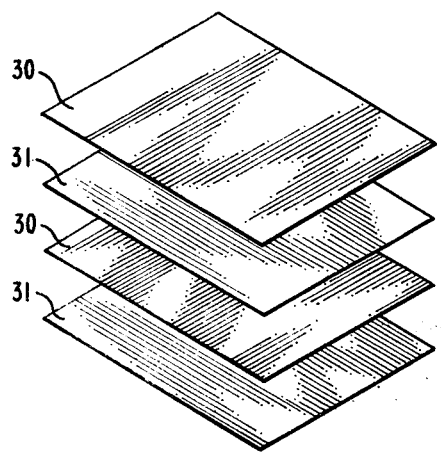
FIG. 4 illustrates resin film sheets having grain orientation of adjacent sheets at right angles and which are bonded together to form a multi-ply laminate for producing the end cap sections of the inner liner.

As shown in FIG. 4, a four-ply resin film laminate is made by bonding together four rectangular sheets 30 and 31 having the same length and width. Rolls of resin film from which the individual sheets are cut have a grained texture that extends along its length in the direction of the roll to give the film greater strength than it exhibits across its width. For this reason, alternate film layers 30 and 31 for the laminate are preferably arranged with the grain directions of adjacent sheets oriented at right angles to one another. Further, two separate rolls of the resin film can be placed at right angles to one another so that the sheets 30 are cut from one roll having a width corresponding to the desired length of the rectangular sheets, while the sheets 31 are cut from the other roll that has a width corresponding to the desired width dimension of the sheet.

Referring to FIG. 5, the film sheets 30, 31 are preferably wiped clean with methanol or other suitable cleaning material which is readily evaporated and then stacked in proper order with their edges aligned to be inserted lengthwise between the nip of a pair of rollers 33 and 34 in a laminating assembly. Axle extensions at both ends of the rollers 33 and 34 are journalled in vertical slots in a pair of vertical supports so that the upper metal roller 33 bears down against the upper surface of the bottom roller 34 to pinch the stacked sheets 30, 31 between the rollers across their width. One end of the stack is inserted lengthwise between the rollers until a narrow margin protrudes outward from the other side. Clamping pressure is then applied to the upper roller 33, and a suitable liquid polymer adhesive, for example, hexafluoroacetone trihydrate, is applied in a bank between each adjacent pair of sheets 30, 31 just forward of the roller nip. The free ends of the sheets 30, 31 are loosely held slightly apart by their edges in a partially elevated position, and the roller drive motor 32 is energized to drive the rollers 33 and 34 at a relatively slow speed. As the sheets 30, 31 gradually advance, the banks of liquid adhesive 36 between sheets are squeezed backward to coat adjacent film surfaces uniformly. Excess liquid adhesive in the banks 36 that is squeezed past the sheet edges may be recovered for later use in a drip tray (not shown). Additional liquid adhesive 36 is added as needed to maintain a generous bank between each pair of sheets. Since the front end of the sheets is passed through the roller before the adhesive banks are added, the sheets at this end will not be bonded, and the possible dissipation of the liquid banks at the edges and the rear may result in spotty binding of the sheets in these areas. Therefore, the laminated sheets are larger in overall area than needed to merely form the end caps 11 and 12 to make sure that a sufficient central area of uniform bonding is available.

After the laminated sheets 30, 31 are removed from the roller assembly and inspected for any bonding voids between sheets in the central area to be used, the laminated resin film is heated to cure the adhesive as well as to remove moisture. Numerous laminated film sheets can be stacked for simultaneous heat curing with loosely woven fiber glass bleeder cloth separating the sheets to permit heat to reach the surfaces between sheets and prevent their sticking together in the heat softened condition. The stacked sheets with the bleeder cloth separators may be heat sealed in a polyethylene bag that is evacuated through an attached vacuum fitting to produce a vacuum of approximately twenty-five inches of mercury and cured in a radiant heat oven from approximately eight to sixteen hours at around 225° F. Upon removal from the oven, the laminated sheets are removed from the polyethylene vacuum bag to be heat sealed in a bag of thick nylon film until ready for vacuum forming.

The hemispherical end caps 11 and 12 shown in FIGS. 1 and 3 may be formed using conventional vacuum forming equipment (not shown) of the type most commonly employed in manufacturing articles from plastic sheets. Such vacuum forming equipment comprises a male die having the desired hemispherical configuration held in an upright position below a movable platen. A clamping frame assembly grips the laminated nylon sheet along its edges holding it horizontally with its center over the male die. A movable electric oven is automatically controlled to bring heating elements into close proximity to the clamped sheet for a predetermined time until the resin is softened sufficiently for forming. While the oven is in position, the upper platen moves downward with the clamping frame forcing the laminated sheet over the hemispherical male die to mold the hemispherically shape of the end caps 11 and 12. The formed sheet 40 shown in FIG. 6, is then lifted free of the male die to be removed from the clamping frame and stored in a heat sealed polyethylene bag until assembly of the liner sections on the mandrel. Due to the die formation of these end caps, the overall thickness of the laminate is reduced somewhat since the resin sheets become slighhtly stretched. Because it is preferred to have an essentially uniform thickness of the inner liner both at the end cap and center cylindrical sections, it is usually necessary to use a laminate for end cap formation that is somewhat thicker than that of the center cylindrical section. Thus, for example, a 4-ply resin sheet laminate may be used for the end caps with a 3-ply laminate for the cylindrical section.

The resin film used in the fabrication of the liner must be heat stabilized prior to lamination and liner formation since uncontrolled shrinkage after formation of the cylinder would reduce the cylinder diameter, tend to deform its shape and cause separation from the diaphragm. A large amount of film may be heat treated at the same time with the film rolled loosely and covered with fiber glass bleeder cloth. The resin heat stabilization is necessary not only to remove undesirable moisture but the resin film is thereby pre-stressed and pre-shrunk. The partciular temperature conditions used will vary depending on the resin material. The temperature must be sufficient to drive off moisture present and produce the necessary pre-shrinking. On the other hand, excessive temperatures must be avoided to prevent undesirable changes in the crystalline structure of the resin. For nylon, for example, the roll is preferably heated in a nitrogen atmosphere in an airtight oven for approximately two hours at 200° F., another two hours at 250° F., and a final four hours at 300° F. Final heat stabilization of nylon at any temperatures between about 250° and about 300° F. is suitable. The cured resin sheet should be stored in an airtight nylon bag until needed for laminating. It is further noted that in any heating steps as described hereinafter involving the liner resin, excessive temperatures should be avoided to prevent undesired resin crystallization. Thus, for example, where nylon is the liner resin selected, temperatures above about 300° F. should be avoided.

It is necessary that the inner liner is of a unitary structure at the curved portion of the end cap sections. Thus, it is especially critical then in forming the liner end cap sections that they be prepared in a "deep-draw" manner so as to provide for a substantial collar extending downwardly from the curved or shoulder portion of the cap as seen in FIG. 6. Accordingly, a cap, formed such that opposing sides are not essentially parallel and which bottom circumferential edge is approximately at the curved shoulder portion of the liner, is unsuitable. A liner formed by using such caps with a central cylindrical section connected to the caps at approximately the curved or shoulder portion of the liner assembly would be generally unable to withstand high pressures due to rupture at the weak shoulder seam. In view of this, a suitable alternative method of preparing the inner liner would be to form only two end cap halves each having relatively long cylindrical sides extending downwardly from the shoulder portion. Such halves may be joined at a single circumferential seam at approximately the center of the liner assembly. Such a liner would not require the use of formation of a central cylindrical section as hereinafter described but would necessitate some modification of the end cap forming equipment described hereinabove as would be obvious to those skilled in the art. Another alternative method of forming the liner would be to vacuum form two liner halves, each having a tub shape corresponding to a longitudinal half of the liner. Although, such a liner would be suitable for lower pressure applications, since it would present a seam at the critical shoulder or curved area, it is somewhat more limited in use.

As shown in FIG. 7, the lamination of the resin sheets for forming the central cylindrical section of the inner liner is accomplished on an upper metal roller 42 having an outer diameter corresponding to the desired inner diameter of the cylinder. A length of resin sheet 44 which is slightly longer than three times the circumference of the upper roller 42 is cut from the precured film roll. After the roller 42 is thoroughly cleaned with methanol or the like, the length of film is inserted lengthwise between the pinch of the rollers 34 and 42, which are rotated without pressure until the upper roller 42 completes one revolution with the film forming a single layer cylinder about it. Rotation is stopped at this point, and a light downward pressure is applied to the upper roller 42. The loose end of the film 44 is held at its corners with a slight upward tilt and a liquid resin adhesive is applied in a generous bank 46 across the width of the sheet at the nip of the rollers. Power is then applied to the motor to rotate the rollers 34 and 42 at a slow speed. Additional liquid adhesive is added as necessary to maintain a generous bank until completion of two more revolutions necessary to form the three-ply cylinder. A slight amount of overlap, preferably no more than a half inch, between the inner and outer ends of the film sheet 44 is desirable to compensate for lack of binding at the ends. Subsequently, the upper roller 42 is removed from the laminating assembly to permit the laminated cylinder to be slid off one end. The completed cylinder may then be sealed in a nylon bag to keep out moisture and until the adhesive has cured. Heat may be applied to hasten curing.

After forming, the end cap sections 11 and 12 and the center cylindrical section 13 of the inner liner must be cut to proper size for assembly on the mandrel. This operation may best performed by the trimmer assembly shown in FIG. 8, which includes an elongated metal cylinder 46 with a hemispherical-shaped end portion having dimensions corresponding to the inner dimensions of the resin liner sections 11, 12 and 14 (FIG. 1). The metal cylinder 46 is journalled horizontally for rotation about its longitudinal axis by a supporting frame structure 47. A pair of cutting arm assemblies 49 and 50 are attached to a horizontal slide bar 52 extending parallel to the axis of the metal cylinder 46. The cutting arms 49 and 50 are each pivotally mounted at one end and have a cutting blade 54 and 55, respectively, mounted at the other end for making contact with the upper surface of the metal cylinder 46. The cutting arm assemblies 49 and 50 are slidably positioned along the slide bar 52 so that the distance between the cutting blades 54 and 55 along the cylinder axis corresponds to the axial length of the central cylindrical inner liner section 14, and are fixed in this position along the slide bar 52, by tightening thumb screws 57 and 58 which contact the surface of the slide bar 52. As also shown in FIG. 8, the three-ply laminated film cylinder is slipped onto the metal cylinder 46 and is centered with respect to the cutting blades 54 and 55. The blades 54 and 55 on the cutting arms 49 and 50 are brought into contact with the laminated resin cylinder and the metal cylinder 46 is rotated with a slight downward pressure exerted by the arms 49 and 50. In this manner, the laminated resin sheet is trimmed to the proper size between the blades 54 and 55. The cut laminate is then removed from the cylinder, and the severed end portions are discarded while the central section retained for assembly.

The cutting of the end cap liner sections 11 and 12 to proper size is performed by fitting the vacuum-formed laminated sheet 40 over the hemispherical end of the metal cylinder 46. The cutting arm assembly 50 is positioned with the blade 55 at the desired point, or if preferred, another cutting arm assembly may be used for this purpose, to cut off a hemispherical section of the desired size. Another cutting arm assembly 60 is pivoted to bring a cutting blade 61 into contact with the polar region of the hemispherical end of the metal cylinder 46, with the point of contact being slighly displaced from the axis of rotation to cut a hole in the end cap sections 11 and 12. It will be appreciated where only one port fitting is to be used, only one end cap section need be cut.

After cutting the laminated resin sheets as outlined above to form the respective end cap sections 11 and 12 and central cylindrical section 14 shown in FIG. 10, assembly thereof is accomplished on a water soluble mandrel shown in FIG. 2, the exterior surface of which corresponds to the inner surface dimensions of the finished unitary inner resin liner. In forming the unitary liner, the central cylindrical section 14 is slid onto and centered approximately on the corresponding portion of the mandrel. The end cap sections 11 and 12 are placed over the hemispherically-shaped ends of the mandrel with the inner portions overlapping the ends of the central cylindrical liner section 14. With the liner sections 11, 12 and 14 in place, a liquid resin adhesive is inserted between the overlapping liner portions in the area of overlap to bind them together and thus form a continuous resin liner layer covering the mandrel. As shown in FIG. 9, the liquid adhesive is distributed uniformly between the overlapping liner section layers in a carefully controlled fashion using an ordinary hypodermic syringe 65. The needle is slid between the layers and controlled amounts of the fluid adhesive is discharged as the needle is moved around the entire circumference. Voids and air bubbles may be squeezed and rolled out by hand, and excess adhesive around the joints or seams cleaned off with methanol or other adhesive solvent. The mandrel with the assembled liner sections is then placed in an evacuated polyethylene bag and heat treated in a circulating air oven at a temperature suitable for curing the adhesive and removing any additional moisture present in the mandrel-liner assembly. After heating, the assembly is removed from the oven for storage in a desiccated container under vacuum at a maximum of 20% relative humidity. Alternatively, the adhesive may be cured by localized heating around the seams, for example, by utilizing a heating band which additionally applies pressure around the liner in the areas of contact. A second alternative is to cure the adhesive while heating the elastomeric dispersion for binding the liner to the intermediate diaphragm as is described hereinafter.

The external surface of the nylon liner is prepared for assembly of the bladder by buffing with an abrasive nylon net of the type commonly used for household cleaning, and then wiped with methanol so that the liner surface is dull with no gloss. The entire exterior liner surface is preferably treated with a suitable material which is capable of reacting with the surface to render it more easily adherent to the diaphragm. An example of such a material particularly useful for treating nylon for butyl rubber adhesion is Hylene M–50 which is methylene bis (phenol isocyanate) in monochlorobenzene solvent. The coating is thereafter partially dried.

The preferred vessel structures of the invention include an intermediate diaphragm which is bonded to the inner liner as will be more fully described hereinafter. The use of a diaphragm acts as a barrier to prevent puncture or weakening of the inner liner by fractured glass particles from the outer housing. For some limited uses, the presence of the diaphragm could be eliminated. However, for optimum performance, the intermediate diaphragm is preferred.

As noted hereinabove, the diaphragm may be prepared from a number of materials including epoxy resins, polyurethane foams, etc. Most preferred are the elastomeric resins such as neoprene, silicone, SBR and the like. Although the following discussion is directed to the use of butyl rubber, it will be appreciated that such other materials may be substituted therefore.

Prior to enclosing the formed and treated inner liner with the elastomeric diaphragm, it is preferred to coat the liner with a dispersion of uncured elastomer or resin that is the same as the diaphragm material so that in later curing, a strong adhesive bond between the liner and diaphragm is provided.

By way of example, butyl rubber dispersed in toluene to a 10% minimum solid concentration is sprayed over the entire liner surface. The butyl dispersion layer is air dried for approximately twenty minutes and force dried for approximately thirty minutes in a preheated oven set at 200° F. from which it is removed and cooled to room temperature. A second coat of the butyl dispersion is then applied over the entire surface and air dried for approximately twenty minutes before being covered by the diaphragm assembly.

The diaphragm assembly half sections 16 and 17 are prepared on a mandrel. The diaphragm assembly half sections are preferably compression molded between male and female die sections under high pressure and temperature conditions well known in the art. For example, uncured butyl rubber is placed in a female cavity mold conforming to the shape and dimensions of the external diaphragm surface. The male die section is then inserted at a compressive force of 20–30 tons with a die temperature of about 350° F. Under such conditions the rubber is liquified, thereby taking the desired shape by flowing within the mold cavity. After approximately thirty to fifty minutes, the rubber is cured after which the mold is released and the half section is removed. The process is repeated for the other half section. The metal port fittings to be used are placed in the molds with the uncured rubber and thus are molded into the diaphragm halves as shown in FIG. 10.

The inside surfaces of the rubber diaphragm sections 16 and 17 are thoroughly cleaned with a chemically compatible cleaning agent, such as methyl ethyl ketone, to remove impurities before coating with a layer of the dilute butyl dispersion used in coating the inner liner surface. The surface treatment is best achieved by turning the cup-shaped diaphragm half sections inside out. The butyl dispersion is allowed to air dry for a minimum of twenty minutes before assembly on the mandrel. At the time of actual assembly, the butyl dispersion layers, both on the inside surface of the diaphragm sections 16 and 17 and on the outer surface of the resin liner covering the mandrel, should be only partially dried.

With the cup-shaped sections turned inside out, the cup-shaped bladder sections are placed on the mandrel having the resin inner liner formed thereon with the port fittings properly aligned with the corresponding opening of the liner and facing outward from the body of the mandrel. With the section 16 or 17 held in this position, the sides are rolled rightly downward reversing the cup shape and bringing the coated interior of the section 16 or 17 into contact with the coated exterior surface of the resin liner sections 11, 12 and 14 already on the mandrel. A tape of uncured butyl rubber is then firmly fitted into the annular recesses formed on each of the diaphragm halves between the shoulders thereof to cover the seam between the two halves. A pressure band may be applied at the joint area between abutting end surfaces of the two bladder half sections 16 and 17 to hold them in abutting position around the center of the mandrel. The uncured band may be partially cured by suitable means so as to prevent the bladder halves from separating during handling prior to fiber glass wrapping. The assembly is shown in FIG. 11 with the port fittings 23 and 24 extending from the ends of bladder sections 16 and 17, respectievly.

The assembly is then ready for winding of fiber glass strand or tape as shown in FIGS. 12 and 13. The fiber glass tape winding is accomplished on an apparatus such as illustrated in FIG. 12. The one end of the assembly is placed on a winding arm 51 which extends into the assembly 50 through one of the port fittings. The winding arm is rotated by rotor 52 which is indexed to provide the correct amount of rotation desired so that adjacent tape strands abut but do not substantially overlap. At the same time, the assembly is rotated end-to-end by the rotating arm 53. Accordingly, as the assembly 50 is rotated longitudinally and circumferentially, the fiber glass tape 54 is wrapped longitudinally around the assembly 50.

The resins for impregnating or coating the fiber glass strands include epoxy, resins, polyesters, polyamide or polyimide resins, etc. Especially preferred are the polyepoxides having a plurality of

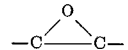

groups prepared by reacting a polyhydric phenol such as bis-phenol A, 2,2-bis-4-hydroxyphenyl propane, with an excess of epichlorohydrin. The uncured resins and a suitable curing agent such as a polyamine, polyamide, carboxylic acid or anhydride may be impregnated in the fiber glass material prior to winding or coated on the separate strand layers during winding.

Suitable tension is maintained on the tape by the winding apparatus and may be varied. It may also be desirable to heat the resin impregnated tape as it is being wrapped to increase its tackiness somewhat. This may be done by use of a portable dryer, for example. It is preferred to wrap the tape longitudinally and circumferentially at about a 1:2 ratio respectively in order to achieve maximum strength. However, ratios other than longitudinal to circumferential wrap ratios may be used if desired. The apparatus for accomplishing the circumferential wrap may be the same as utilized for longitudinal wrapping as shown in FIG. 12 with the rotating arm 53 remaining stationary as the assembly 50 is rotated by winding arm 51. Alternatively, a separate winding device as shown in FIG. 13 may be used for the circumferential wrapping.

After the assembly 50 has been wrapped with fiber glass tape to the desired thickness, the tape is cut and the end secured. The outer layer is then coated with a composition having low friction characteristics such as polytetrafluoroethylene, i.e. Teflon. Fiber glass tape is again wrapped around the assembly to the desired thickness. These wrapping steps may be repeated with a Teflon coating following successively desired layers in order to provide a slip plane between the fiber glass layers. Any number of fiber glass tape layers may be incorporated depending on the overall strength of the final vessel desired. It is important that at least one slip plane be present in the exterior fiber glass housing. Without the presence of a slip plane, the vessel will be structurally weak and fail on repeated cycling of pressures. Thus, it has been found that during pressure cycling, without the slip planes, fatigue on a single unitized fiber glass housing results in breakdown of the resin and glass fibers which results in vessel failures and loss of pressure. On the other hand, where one or more slip planes are present, the individual fiber glass housing layers between the slip planes can expand and contract independently thereby significantly increasing overall strength and resistance. The Teflon coating may be applied on any fiber glass layers desired but preferably between one or more combined longitudinal and circumferential wrappings.

Following the final wrapping step, the vessel, now essentially in its completed form is placed in an oven and heated to appropriate temperatures to cure the resin impregnated into the fiber glass tape as well as completely cure the elastomeric diaphragm. Again, excessive temperatures which will result in undesired changes in liner resin crystalline structures should be avoided. It is desirable to wrap the vessel with a bleeder cloth which absorbs excess resin from the outer surface. The final step consists of removing the water soluble mandrel from inside the vessel. This may be accomplished in any convenient manner, such as by flowing water through the vessel at the port fittings.

The vessels of the invention have superior resistance to repeated cycling at high gas pressures and are capable of storing gases under high pressures for long periods of time.

What is claimed is:

1. A vessel for storing gases under high pressure comprising a thermoplastic resin inner liner and an exterior housing composed of multiple layers of resin impregnated fiber glass strands wherein the strands of adjacent layers are substantially perpendicular and having a low friction slip plane comprising a composition having low friction characteristics between at least two of said layers.

2. The vessel of claim 1 wherein the composition comprises a resin having low friction characteristics.

3. The vessel of claim 2 wherein the resin comprises polytetrafluoroethylene.

4. A hollow vessel for storing gases under high pressure comprising:
   (a) a thermoplastic resin inner liner;
   (b) an elastomeric diaphragm bonded to and completely enclosing the inner liner; and,
   (c) an exterior housing composed of multiple layers of resin impregnated fiber glass strands wherein the strands of adjacent layers are substantially perpendicular and having a low friction slip plane comprising a composition having low friction characteristics between at least two of said layers.

5. The vessel of claim 4 wherein the liner comprises laminated multiple layers of thermoplastic resin.

6. The vessel of claim 4 wherein the inner liner resin is selected from the group consisting of polyamides, polyvinyl halides, polyvinylidene halides and polytetrafluoroethylene.

7. The vessel of claim 4 wherein the elastomeric diaphragm is a material selected from the group consisting of neoprene, styrene-butadiene copolymers, silicone rubber and butyl rubber.

8. The vessel of claim 4 wherein the fiberglass impregnating resin is selected from the group consisting of epoxy resins, polyesters and polyamides.

9. The vessel of claim 4 wherein the composition comprises a polytetrafluoroethylene resin.

10. The vessel of claim 4 wherein the inner liner is composed of a unitized liner assembly consisting of an elongated cylindrical central section and two end cap sections each having a hemispherically shaped upper portion and cylindrical elongated sides extending from said upper portion, the circumference around the edge of said cylindrical sides being approximately equal to the diameter of the edge of said cylindrical central section.

11. The vessel of claim 10 wherein the inner liner comprises multi-ply laminated resin sheets wherein the number of plies present in said end cap sections is greater than the number of plies in said central section.

12. The vessel of claim 4 wherein said vessel has elongated cylindrical sides and upper and lower hemispherically shaped end portions from which extend port fittings which provide an opening from the exterior of said vessel to the hollow interior thereof.

References Cited

UNITED STATES PATENTS

| | | | |
|---|---|---|---|
| 2,848,133 | 8/1958 | Ramberg | 220—3 |
| 3,073,475 | 1/1963 | Fingerhut | 220—3 |
| 3,074,585 | 1/1963 | Koontz | 220—3 |
| 3,392,865 | 7/1968 | Dryden | 220—83 XR |

RAPHAEL H. SCHWARTZ, Primary Examiner

U.S. Cl. X.R.

220—83